(12) United States Patent
Malekkhosravi et al.

(10) Patent No.: US 7,472,304 B2
(45) Date of Patent: Dec. 30, 2008

(54) DOUBLE DATA RATE SYSTEM

(75) Inventors: Behnam Malekkhosravi, La Jolla, CA (US); Nadim Hashim Shaikli, Escondido, CA (US)

(73) Assignee: Rapid Bridge, LLC, San Diego, CA (US)

( * ) Notice: Subject to any disclaimer, the term of this patent is extended or adjusted under 35 U.S.C. 154(b) by 162 days.

(21) Appl. No.: 11/517,838

(22) Filed: Aug. 30, 2006

(65) Prior Publication Data

US 2008/0059827 A1 Mar. 6, 2008

(51) Int. Cl.
  *G06F 1/12* (2006.01)
  *G06F 1/00* (2006.01)
  *H03L 5/00* (2006.01)
(52) U.S. Cl. .............. 713/401; 713/500; 327/158
(58) Field of Classification Search .......... 713/500, 713/600, 401
See application file for complete search history.

(56) References Cited

U.S. PATENT DOCUMENTS

| | | | |
|---|---|---|---|
| 6,665,230 B1 | 12/2003 | Shrader et al. | |
| 6,760,856 B1 | 7/2004 | Borkenhagen et al. | |
| 6,940,768 B2 * | 9/2005 | Dahlberg et al. | 365/201 |
| 7,003,686 B2 * | 2/2006 | Chua-Eoan et al. | 713/600 |
| 7,062,625 B1 | 6/2006 | Shrader et al. | |
| 7,181,639 B2 * | 2/2007 | Chua-Eoan et al. | 713/600 |
| 7,215,584 B2 * | 5/2007 | Butt et al. | 365/193 |
| 7,237,136 B2 * | 6/2007 | Li et al. | 713/401 |
| 2005/0007203 A1* | 1/2005 | Chen | 331/45 |

FOREIGN PATENT DOCUMENTS

| | | |
|---|---|---|
| EP | 1 137 188 A2 | 9/2001 |
| EP | 1137188 A2 * | 9/2001 |
| JP | 2004032586 A * | 1/2004 |

OTHER PUBLICATIONS

International Search Report for International Patent Application No. PCT/US07/71919, filed Jun. 22, 2007, International Search Report completed Apr. 4, 2008 and mailed May 1, 2008 (2 pgs.).
Written Opinion of the International Search Report for International Patent Application No. PCT/US07/71919, filed Jun. 22, 2007, Written Opinion of the International Search Report completed Apr. 4, 2008 and mailed May 1, 2008 (3 pgs.).

* cited by examiner

*Primary Examiner*—Suresh K Suryawanshi
(74) *Attorney, Agent, or Firm*—Klein, O'Neill & Singh, LLP (57) ABSTRACT

An extendible timing architecture for an integrated circuit is disclosed. The extendible timing architecture provides metal programmable components for use with different operational clock frequencies. In some embodiments the architecture utilizes master/slave DLLs with a double data rate memory circuit.

36 Claims, 5 Drawing Sheets

DOUBLE DATA RATE SYSTEM

BACKGROUND

The invention relates generally to memory interface circuitry, and more particularly to extendible timing circuitry for double data rate memory applications.

Memory interface circuitry generally may include arbitration circuitry, application specific circuitry, and physical layer interface circuitry. This circuitry is generally provided by an asynchronous integrated circuit (ASIC) separate from the memory. The arbitration circuitry generally performs functions relating to accessing a system bus using an implementation specific bus protocol and otherwise formats transmitted and received data and instructions as appropriate. The application specific circuitry generally includes control circuitry for generating memory access commands and circuitry for generally controlling interaction with a memory. The physical (PHY) circuitry transmits signals from the ASIC to the memory and receives signals from the memory.

Design of PHY circuitry for interfacing with double data rate (DDR) memories, for example, may be difficult. A DDR memory generally transfers data on both a high clock transition and a low clock transition, thereby providing effectively a doubling of the effective clock rate. Accordingly, PHY circuitry interfacing with a DDR memory must also generally be able to process data at effectively double the clock rate of other circuitry. In addition, a DDR memory also requires use of a bidirectional data strobe signal (DQS), the timing of which may be 90 degrees out of phase with the clock signal during read operations and edge aligned during write operations, and a DDR memory also generally imposes tight timing restrictions on signals provided to and from the memory.

Furthermore, clock and signal timing may be adversely affected by a number of factors. For example, timing of clock signals provided to a port of the ASIC may be skewed by routing dependent propagation delay, both as to length of signal routing, variations in capacitance and inductance of signal paths, cross-talk or other noise from signals on nearby signal paths. Clock generation or reproduction circuitry may also be adversely impacted by power supply voltage variations and power supply related noise, particularly when used with circuitry using high switching frequencies. Clock and timing may also be unduly affected by provision of multiple power supply domains, which may be required for analog circuits and digital circuits, by voltage gradients within or across power supply domains, particularly larger size domains, and at transitions across power supply domains.

Moreover, resolution of timing related issues, whether it is distortion of a data eye or clock skew, may be difficult. Ensuring that a circuit design meets appropriate timing budgets may often be a time consuming process, often requiring the use of skilled personnel and complicated analysis for every design. Further, often when a circuit design does meet the appropriate timing budget and other constraints, the design is only valid for the particular circuit, and the circuit cannot be extended for use with additional memories without re-design and concomitant time consuming time budget revivification.

BRIEF SUMMARY OF THE INVENTION

The invention provides designs and circuitry for use with for example memory related circuitry. In one aspect the invention provides an integrated circuit comprising a phase locked loop (PLL) configured to generate at least one clock signal based on a reference signal; a delay locked loop (DLL) configured to receive a representation of the clock signal and determine a number of delay elements corresponding to a specified phase offset; circuitry to generate a signal indicative of the number of delay elements; and a further DLL configured to generate an offset clock signal based on a representation of the clock signal and a representation of the signal indicative of the number of delay elements. In a further aspect of the invention the PLL is metal programmable for generating clock signals about different frequencies. In a further aspect of the invention the DLL and the further DLL each have a delay chain of delay elements and the delay elements of the delay chain for the further DLL have a known delay relationship to the delay elements of the delay chain of the DLL. In a further aspect of the invention the DLL has associated voltage regulation circuitry, the associated voltage regulation circuitry of the DLL providing regulated voltage to the delay chain of the DLL, the further DLL has associated voltage regulation circuitry, the associated voltage regulation circuitry of the further DLL receiving an indication of regulated voltage provided to the delay chain of the DLL and providing regulated voltage to the delay chain of the further DLL based on the indication of regulated voltage provided to the delay chain of the DLL. In a further aspect both DLLs are metal programmable to provide optimum resolution for specific data rates; a set of metal configurable interface IOs specifically defined with integrated logic to allow for data rate conversion, clock re-synchronization and phase offsetting and load balancing. In a further aspect the invention provides a physical implementation of an architecture providing a correct by construction approach wherein the architecture defines at least an extendible clock distribution scheme providing a signal indicative of a specified phase offset distributed to a plurality of metal configurable digital locked loops (DLLs), the DLLs approximate one or more input-output pads of an integrated circuit, and a power regulation scheme providing a power control signal distributed to the DLLs.

These and other aspects of the invention are more fully comprehended on review of this disclosure.

DETAILED DESCRIPTION

Figure 1:
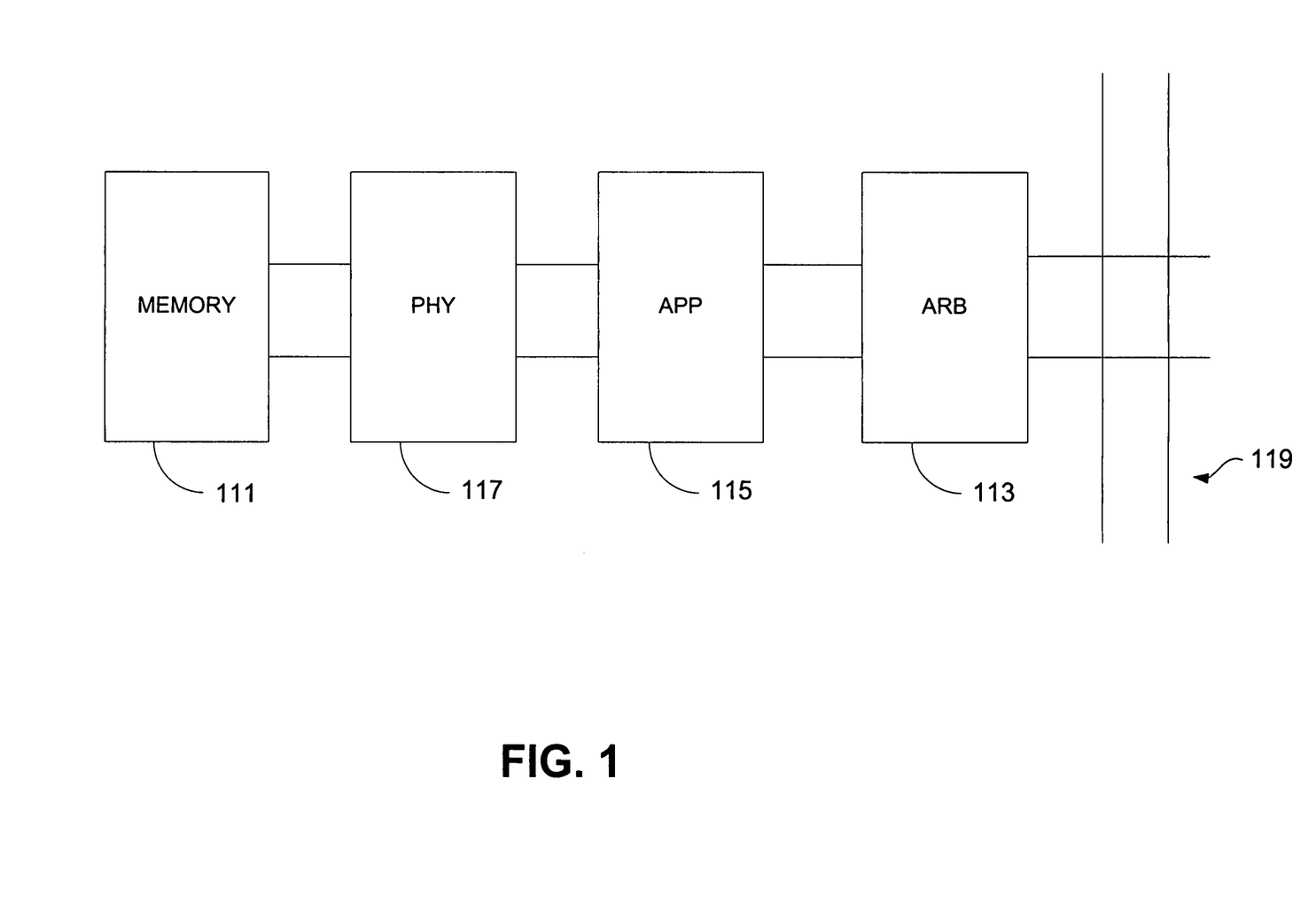
FIG. 1 is a block diagram of a memory and a memory control and interface circuit.

FIG. 1 is a block diagram of a memory 111 and memory controller. The memory retains information. A system accesses the memory, for reads and/or writes, by way of the memory controller. The memory controller is shown in FIG. 1 with a physical layer (PHY) 117, an application layer 115, and an arbitration layer 113. The arbitration layer generally includes port arbitration logic, data formatting logic for external bus formats, and logic for other functions. As illustrated, the arbitration layer is conceptually shown as connected to a bus 119. The application layer generates control information specific to the protocol used by the particular memory.

The PHY transmits signals to the memory and receives signals from the memory. The signals generally include data signals to be written to the memory, data signals read from the memory, a differential clock signal provided to the memory, and a bidirectional data strobe (DQS) signal. The DQS signal is provided by the PHY on data writes in phase with the differential clock signals and is provided by the memory on data reads 90 degrees out of phase with the differential clock signal.

In operation, the arbitration layer receives requests provided over the bus from external components for data to be written to or read from the memory. The arbitration layer provides the requests to the application layer, which processes the requests to generate control signals required by the particular memory implementation. The PHY provides appropriate signals for the requested operation to the memory. For data reads, the PHY also receives data from the memory, and provides the data for further processing and formatting to the application layer. The application layer provides the data, formatted as required, to the arbitration layer. The arbitration layer accesses the bus and provides the data to the external component.

Figure 2:
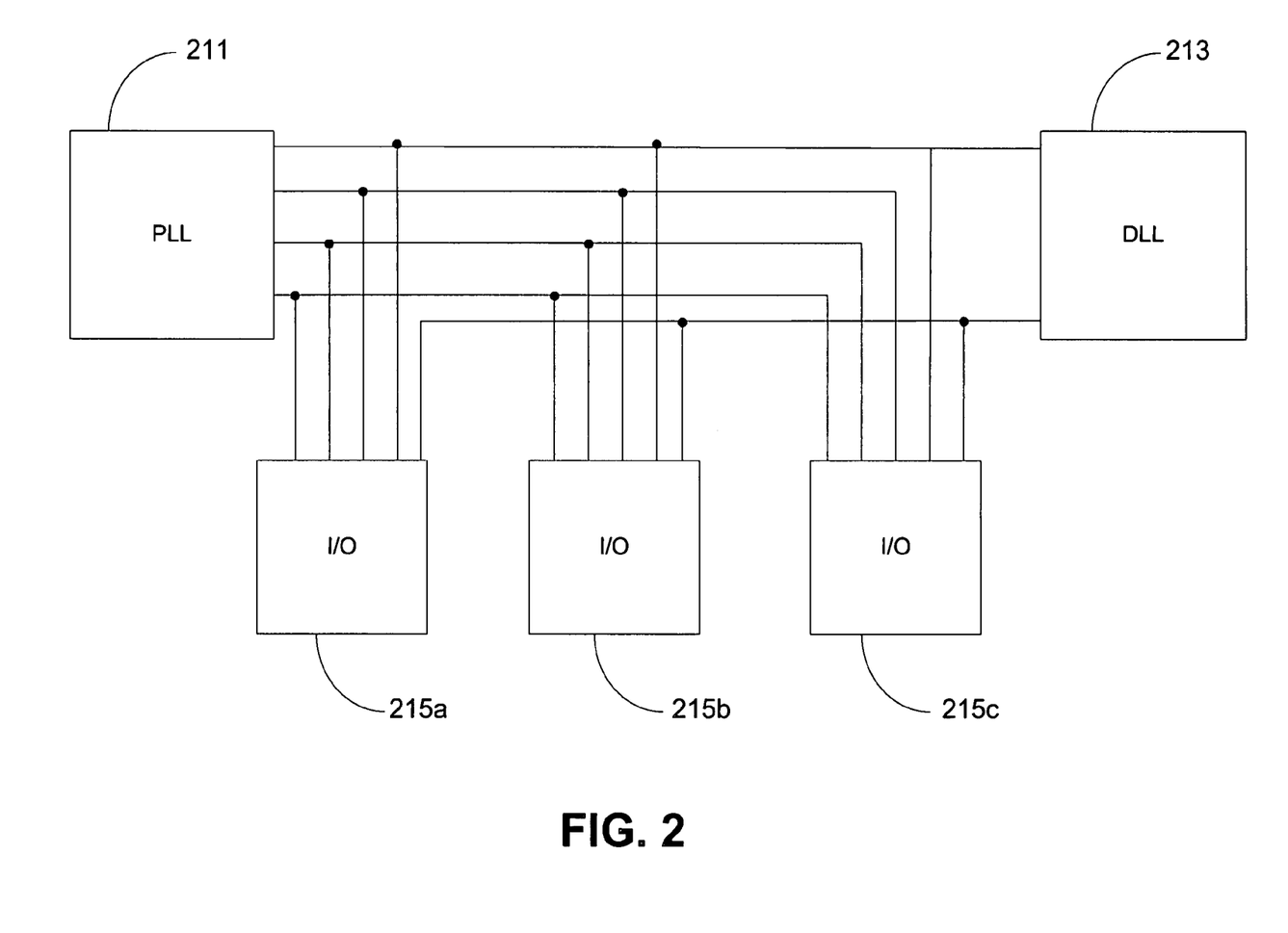
FIG. 2 is a block diagram of portions of a memory interface circuit.

FIG. 2 is a block diagram showing portions of the PHY. A phase-locked loop (PLL) 211 generates a plurality of phase shifted clock signals. The phase shifted clock signals are provided to a plurality of I/O logic blocks 215*a-c*, which interface with memory elements (not shown). Preferably the I/O logic blocks are physically implemented in or approximate to I/O pads of an ASIC. One of the phase shifted clock signals is also provided to a master DLL 213. In the embodiment of FIG. 2, the PLL provides four phase shifted clock signals, with the clock signals each having a separation of 90 degrees from adjacent clock signals. In other embodiments, however, different numbers of clock signals are provided with different phase separations. For example, in some embodiments eight phase shifted clock signals are provided, with a phase separation of 45 degrees between adjacent clock signals.

The PLL includes, for example, a loop with a comparator, a loop filter, an oscillator, and, usually, a divider. The comparator is configured to receive a reference clock signal and a feedback clock signal from the divider, with the divider used to allow for frequency multiplication of a lower frequency reference clock signal. The comparator provides an indication of phase difference to the loop filter, with the output of the loop filter providing an up/down signal to the oscillator. The oscillator, which may be implemented as a ring oscillator or other structure, provides the plurality of phase shifted clock signals. Using the embodiment of a ring oscillator as an example, each of the phase shifted clock signals may be provided by taking a tap between different elements of the ring oscillator.

Preferably the PLL is metal programmable for different operating ranges. In some embodiments different numbers of oscillator elements are coupled together depending on the metal programming, with possibly different numbers of oscillator elements between taps. For example, higher frequency clock signals may require a reduced number of oscillator elements between taps, as well as potentially use of different numbers of oscillator elements for proper operation. Use of a metal programmable PLL allows for reuse of a single basic PLL design for different operational frequencies.

At least one, with FIG. 2 showing only one, of the phase shifted clock signals are received by the master delay-locked loop (DLL) 213. The master DLL includes a digital delay chain. The delay chain may include, for example, 128 delay elements. The master DLL determines, using the delay chain, a code indicative of a 90 degree phase offset. In general, the code is indicative of a number of delay elements through which the clock signal received by the master DLL must pass to have a phase offset of 90 degrees. In some embodiments the code is a seven bit code. In different embodiments the number of bits in the code may be different, depending for example on the number of delay elements in the delay chain or the maximum number of delay elements required to produce a 90 degree phase offset in the clock signal.

In some embodiments the master DLL includes metal programmable delay elements having different delays. The use of delay elements having different delays allows for increased adaptability and extendibility of the circuit. For example, delay elements providing relatively small delays may be more suitable for use with clock signals of higher frequencies, providing greater granularity of division of the clock period. Similarly, delay elements providing relatively larger delays may be more suitable for use with clock signals of lower frequencies, so as to allow for a 90 degree phase offset to be located within the 128 delay element chain. Thus, depending on an expected clock speed, different delay chains may be metal programmed for use to accord a substantially similar granularity of division of a clock cycle.

The code indicative of a phase offset is provided to each of the I/O logic blocks. Also provided to each of the I/O logic blocks, as previously mentioned, are the phase offset clock signals. Each I/O logic block transmits information for a corresponding memory and receives information from the memory.

Figure 3:
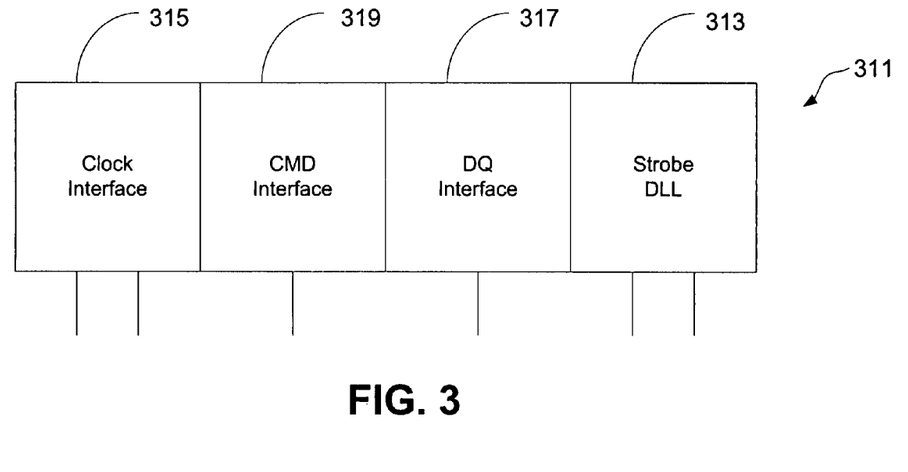
FIG. 3 is a block diagram of portions of an input/output block for interfacing with a double data rate memory circuit.

FIG. 3 is a block diagram of a sample I/O logic block. The I/O logic block includes a Strobe/DLL block 313, a clock interface block 315, a DQ interface block 317, and a command interface block 319. The clock interface block receives a differential clock signal, such as two of the clock signals provided by the PLL discussed with respect to FIG. 1, with the clock signals 180 degrees out of phase with one another. The clock interface block provides the clock signals to a memory. The command interface provides commands, addresses and mask data to the memory, with the commands, addresses and mask data clocked to the clock signals provided by the clock interface block. The DQ block sources and sinks bidirectional data on a DQ bus, with the DQ block sourcing data to the memory on data writes and sinking data from the memory on data reads.

The Strobe/DLL block generates and receives memory strobe signals. The memory strobe signals are bidirectional, with the strobe signals generated by the memory on read operations and generated by the Strobe/DLL block on write operations. For read operations the strobe signals are edge aligned with the read data. For write operations the strobe signals are eye-aligned, or phase offset by 90 degrees, from the data. Accordingly, the Strobe/DLL block includes a DLL for generating the 90 degree phase offset.

The DLL of the Strobe/DLL block receives the phase offset clock signals from the PLL. The DLL of the Strobe/DLL block also receives the code indicative of a 90 degree phase offset from the master DLL. The DLL of the Strobe/DLL block uses the code to generate a strobe signal with a phase offset of 90 degrees. The DLL of the Strobe/DLL block, for convenience, may be termed a slave DLL in that operation of the DLL is based on operations of the master DLL.

In most embodiments the slave DLL includes a digital delay chain identical to the digital delay chain of the master DLL. Thus, if the master DLL includes a delay chain of 128 delay elements, each with a specified delay, then the slave DLL also includes a delay chain of 128 delay elements with the specified delay. However, in some embodiments the delay chain may have more or fewer delay elements, or the delay elements may merely have a delay of known relation to the delay elements of the master DLL. Preferably, however, the delay chain of the slave DLL is identical to the delay chain of the master DLL. Identical delay chains provide benefits in that process, temperature, and other variations are likely to affect identical delay chains in the same manner, increasing the likelihood that a determination by the master DLL of a 90 degree phase offset will also result in a 90 degree phase offset when applied to the slave DLL.

Figure 6:
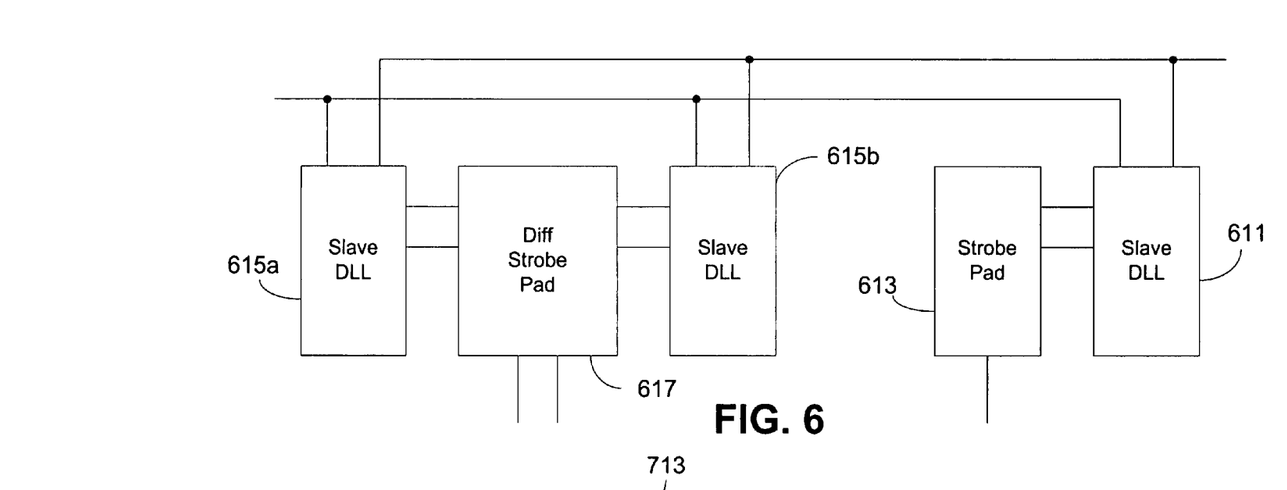
FIG. 6 is a block diagram of a single ended and double ended input/output circuit in accordance with aspects of the invention.

Moving forward to FIG. 6, FIG. 6 shows an embodiment of a Strobe/DLL block for a signal ended strobe and a Strobe/DLL block for a differential strobe. The single ended strobe block includes a strobe pad 613 for sourcing and sinking a strobe (DQS) signal. A slave DLL is shown adjacent to the strobe pad 613, and preferably the slave DLL is physically adjacent the strobe pad to reduce, for example, routing related timing issues, for example reducing or eliminating potential delays that may affect the timing budget. The slave DLL includes a digital delay chain as discussed above, and receives a signal indicative of a number of delay elements to be used to generate 90 degree phase offset clock signal for use with write operations. The slave DLL also receives phase offset clock signals, such as provided for example by the PLL discussed above.

The differential strobe includes two slave DLLs 615a,b and a differential strobe pad. The slave DLLs are shown in FIG. 6 as adjacent on either side of the differential strobe pad, and in physical implementations are preferably also placed adjacent to, and possibly on opposing sides of, the differential strobe pad. A single slave DLL could be used to generate differential strobe signals, and in some embodiments a single slave DLL is used with a differential strobe pad. However, use of multiple slave DLLs provides benefits in that slave DLLs with similar or the same designs may be used without exposure to possible issues relating to increased current sourcing or power usage requirements, along with concomitant verification and timing resolution issues.

Figure 4:
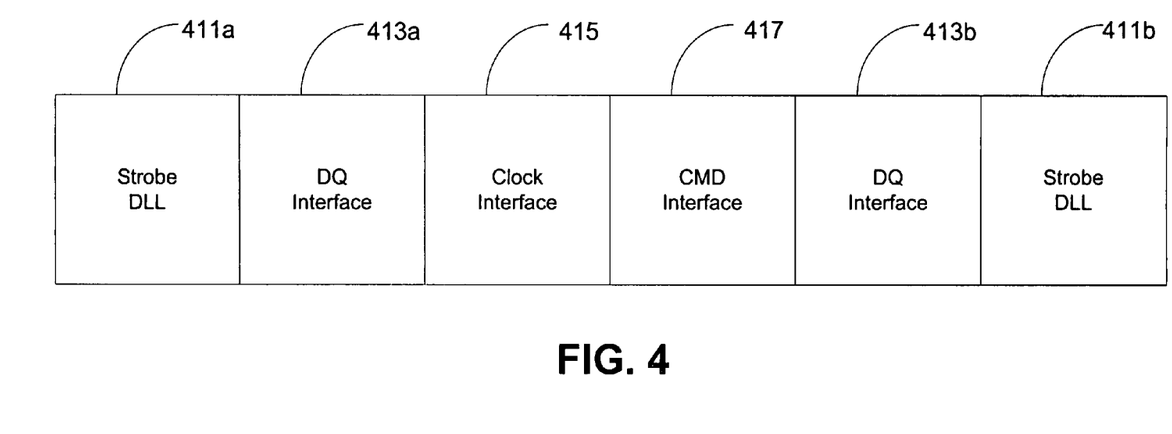
FIG. 4 is a further block diagram of portions of an input/output block for interfacing with a double data rate memory circuit.

Returning to FIG. 4, FIG. 4 is a block diagram of a further I/O logic block. The further I/O logic block includes a clock interface block 415 adjacent to a command interface block 417. On either side of the clock interface block and command interface block are a strobe/DLL block 411a,b, respectively, and a corresponding DQ interface block 413a,b, respectively. Thus, the strobe/DLL blocks are each adjacent a DQ interface block. The command interface blocks provide address and command signals to a memory (not shown). The DQ interface blocks transmit to and receive data from the memory, generally over a DQ bus. The strobe/DLL blocks transmit to and receive from the memory strobe (DQS) signals. Placing the strobe/DLL blocks adjacent to the DQ interface blocks allows for tighter timing control over the DQS and data signals.

Figure 5:
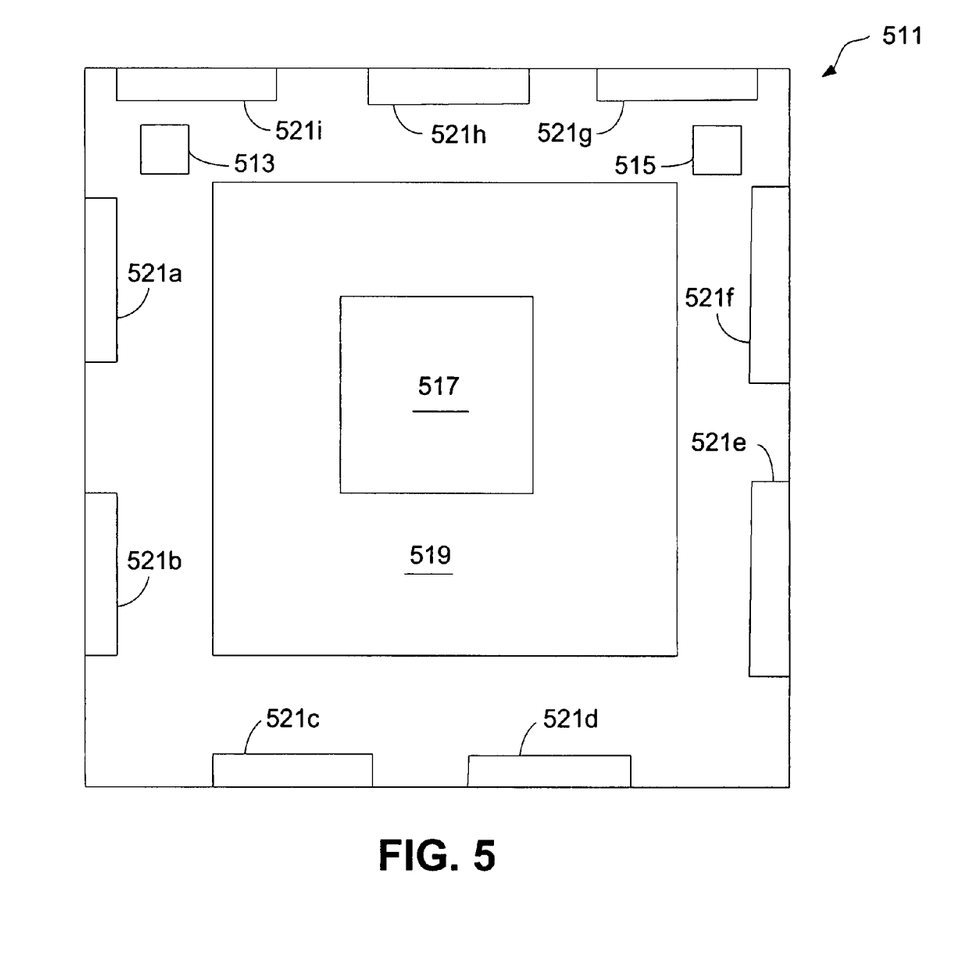
FIG. 5 illustrates a block layout of an ASIC providing a memory control and interface circuit.

FIG. 5 illustrates a layout of an integrated circuit in accordance with aspects of the invention. The integrated circuit includes arbitration layer circuitry and application layer circuitry. As illustrated, the arbitration layer circuitry and the application layer circuitry are locked roughly approximate a center of the die of the integrated circuit. In general, timing and routing issues are of reduced importance for these circuit elements, and location on the die is not as critical as it may be for other circuit elements. The integrated circuit also includes PLL circuitry. The PLL circuitry generates a plurality of phase offset clock signals. A one of the phase offset clocks signals is provided to a master DLL. The master DLL is shown located on the opposite side of the die from the PLL. The master DLL may be, in some embodiments, a master DLL as previously described. The master DLL generates a signal in the form of a code indicative of a number of delay elements to be used to create a clock signal with a phase offset of 90 degrees from a clock signal provided by the PLL.

A plurality of I/O logic blocks are located about the periphery of the integrated circuits. The I/O logic blocks are preferably co-located with the I/O pads of the integrated circuit. The I/O logic blocks receive command information from the application layer, the phase offset signals from the PLL, and the signal indicative of a number of delay elements to be used to form a further clock signal with a 90 degree offset from the master DLL.

Power supply variations may also adversely affect timing control. Accordingly, in some embodiments the master DLL includes a voltage regulator. Preferably the voltage regulator includes a low pass filter. In some embodiments the cutoff frequency for the low pass filter is between 1 MHz and 2 MHz. In addition, in most embodiments each slave DLL also includes a voltage regulator. Preferably the voltage regulator in each slave DLL is a slave voltage regulator in that voltage regulation in the slave DLL is based on a voltage set signal provided by the master DLL.

Figure 7:
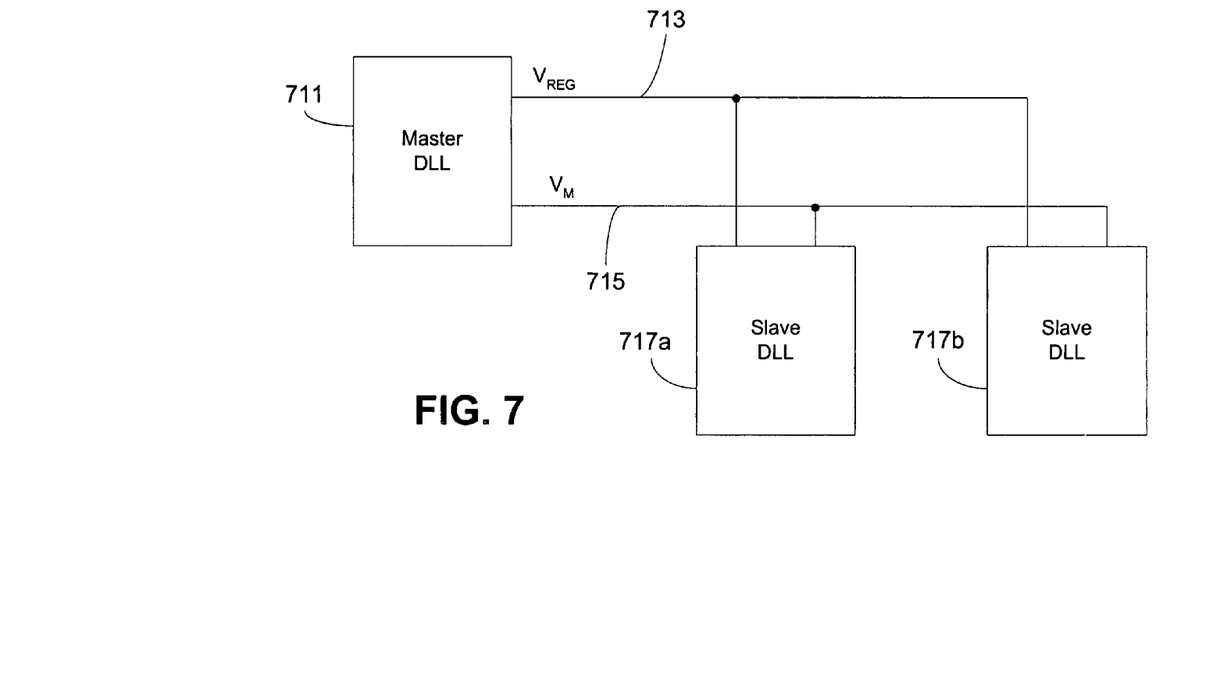
FIG. 7 is a block diagram of a power distribution system in accordance with aspects of the invention.

As shown in FIG. 7, a master DLL 711 sources a Vreg signal and a Vm signal. The Vreg and Vm signals are provided to a plurality of slave DLLs 717a,b. The Vreg signal provides regulated power to the slave DLLs. The Vm signal provides a voltage reference signal for use by the slave voltage regulators in the slave DLLs. Preferably, the slave voltage regulators provide power for delay chains in each slave DLL, with control and other decoding logic powered by a separate Vdd signal, thereby decreasing noise impacting operation, and particularly timing, of the delay chain in each slave DLL. Moreover, regulation of power to the delay chain in each slave DLL based on power provided to the delay chain in the master DLL decreases potential variations in timing through the delay chains. This allows for an increase in the number of banks with self contained slave regulation without impact to the overall power distribution. Moreover, preferably the $V_{REG}$ and $V_M$ of all slave and master regulators are connected to reduce or eliminate possible supply gradients between DLLs and to reduce the noise spectrum difference.

Thus, that timing relationships are self contained within each block and the architecture described herein is extendible, and in some embodiments extended, to wider bus configurations without significant impact to top level clock distribution design. Moreover, ease of verification and validation of the entire system is improved by providing hierarchically constructed system with self contained timing budgets. Indeed, in some embodiments, such as the embodiments specifically described, the architecture and physical implementation provides a correct by construction approach.

Although aspects of the invention have been described with respect to certain embodiments, it should be recognized that the invention includes the claims and there insubstantial variations supported by this disclosure.

What is claimed is:

1. An integrated circuit comprising:
   a phase locked loop (PLL) configured to generate at least one clock signal based on a reference signal;
   a delay locked loop (DLL) configured to receive a representation of the clock signal and determine a number of delay elements corresponding to a specified phase offset;
   circuitry to generate a signal indicative of the number of delay elements;

a further DLL configured to generate an offset clock signal based on a representation of the clock signal and a representation of the signal indicative of the number of delay elements.

2. The integrated circuit of claim 1 wherein the PLL is configured to generate a plurality of clock signals, the at least one clock signal being one of the plurality of clock signals.

3. The integrated circuit of claim 2 wherein the PLL is metal programmable for generating clock signals about different frequencies.

4. The integrated circuit of claim 2 wherein the DLL and the further DLL each have a delay chain of delay elements and the delay elements of the delay chain for the further DLL have a known delay relationship to the delay elements of the delay chain of the DLL.

5. The integrated circuit of claim 2 wherein the DLL and the further DLL each have a delay chain of delay elements and the delay chain of the DLL and the delay chain of the further DLL are identical.

6. The integrated circuit of claim 4 wherein the DLL has associated voltage regulation circuitry, the associated voltage regulation circuitry of the DLL providing regulated voltage to the delay chain of the DLL.

7. The integrated circuit of claim 6 wherein the further DLL has associated voltage regulation circuitry, the associated voltage regulation circuitry of the further DLL receiving an indication of regulated voltage provided to the delay chain of the DLL and providing regulated voltage to the delay chain of the further DLL based on the indication of regulated voltage provided to the delay chain of the DLL.

8. The integrated circuit of claim 7 wherein the DLL comprises a master DLL and the further DLL comprises a slave DLL.

9. The integrated circuit of 8 further comprising a plurality of slave DLLs, the slave DLL being one of the plurality of slave DLLs.

10. The integrated circuit of claim 9 wherein the slave DLLs are configured approximate I/O pads of the integrated circuit.

11. The integrated circuit of claim 10 wherein the slave DLLs are configured as part of the I/O pads of the integrated circuit.

12. The integrated circuit of claim 10 further comprising arbitration layer circuitry, application layer circuitry, and memory interface circuitry.

13. The integrated circuit of claim 12 wherein the slave DLLs are part of the memory interface circuitry.

14. The integrated circuit of claim 13 wherein the memory interface circuitry includes a plurality of strobe pads, each of the strobe pads providing at least one strobe signal for a memory.

15. The integrated circuit of claim 14 wherein each strobe pad has at least one associated slave DLL.

16. The integrated circuit of claim 15 wherein each strobe pad has an associated slave DLL for each strobe signal provided by the strobe pad.

17. The integrated circuit of claim 16 wherein the memory interface circuitry further includes a plurality of data bank interface circuits, with each strobe pad having an associated data bank circuit.

18. The integrated circuit of claim 1 wherein the offset clock signal has a phase offset of 90 degrees to the representation of the clock signal.

19. A die including integrated circuitry, comprising:
a plurality of I/O pads on and about the periphery of the die;
a plurality of slave digital locked loops (DLL) on the die and approximate at least some of the I/O pads, with at least one slave DLL approximate each of the some of the I/O pads, each of the slave DLLs configured to receive at least one clock signal and a reference signal and to provide at least one signal with a phase offset from the at least one clock signal dependent on the reference signal;
a master DLL on the die, the master DLL configured to provide the reference signal, with the die including signal routing elements to provide the reference signal to each of the slave DLLs; and
a phase locked loop (PLL) on the die, the PLL configured to generate a plurality of periodic signals of the same frequency but differing in phase, the plurality of periodic signals including the at least one clock signal, with the die including signal routing elements to provide at least one of the periodic signals to the master DLL and signal routing elements to provide the plurality of periodic signals to each of the slave DLLs.

20. The die of claim 19 wherein the master DLL is located near a first corner of the die and the PLL is located near a second corner of the die.

21. The die of claim 19 wherein slave DLLs are adjacent the I/O pads.

22. The die of claim 19 wherein the slave DLLs form part of the I/O pads.

23. The die of claim 19 wherein the PLL is metal programmable for operation about different frequencies.

24. The die of claim 19 wherein the master DLL and the slave DLLs are metal programmable for operation about different frequencies.

25. The die of claim 19 wherein the PLL, the master DLL, and the slave DLLs are metal programmable for operation about different frequencies.

26. The die of claim 19 wherein the master DLL and the slave DLLs each include a delay chain, elements of the delay chain of the master DLL and elements of the delay chain of the slave DLLs having a known delay relationship to each other.

27. The die of claim 19 wherein the master DLL and the slave DLLs each include a delay chain having delay elements, each delay chain including identical delay elements.

28. The die of claim 19 wherein the die includes memory interface circuitry for interfacing with a memory external to the die, and the slave DLLs are part of the memory interface circuitry.

29. The die of claim 28 wherein the memory circuitry includes a plurality of strobe pads, each of the strobe pads configured to provide strobe signals for a memory on a strobe signal line.

30. The die of claim 29 wherein the die includes at least one slave DLL for each strobe signal line.

31. The die of claim 19 wherein the phase offset is 90 degrees.

32. The die of claim 19 wherein the master DLL has associated voltage regulation circuitry, the associated voltage regulation circuitry configured to provide a voltage regulation signal.

33. The die of claim 32 wherein the die further includes signal routing elements for the voltage regulation signal routing the voltage regulation signal to the slave DLLs.

34. The die of claim 33 wherein each slave DLL has associated voltage regulation circuitry configured to provide regulated voltage to a delay chain of the slave DLL based on the voltage regulation signal.

35. An integrated circuit structure adapted for multi-rate configurability, comprising:
a phase locked loop (PLL) metal configurable for operation in different frequency ranges, the PLL configured to provide a plurality of clock signals with the same frequency but differing phases;

a master delay locked loop (DLL) metal configurable for operation in different frequency ranges, the master DLL configured to receive at least one of the plurality of clock signals and to provide a signal indicative of a number of delay elements for a specified phase offset; and a plurality of slave DLLs metal configurable for operation in different frequency ranges, each of the slave DLLs configured to receive at least one of the plurality of clock signals and the signal indicative of a number of delay elements for the specified phase offset and to provide a signal with the specified phase offset compared to the at least one of the plurality of clock signals.

36. The integrated circuit structure of claim 35 wherein the specified phase offset is 90 degrees.

* * * * *